(12) United States Patent  (10) Patent No.: US 9,367,172 B2
Chang et al.  (45) Date of Patent: Jun. 14, 2016

(54) TOUCH TRACE DETECTING DEVICE, SYSTEM AND METHOD THEREOF

(71) Applicant: EGALAX_EMPIA TECHNOLOGY INC., Taipei (TW)

(72) Inventors: Chin-Fu Chang, Taipei (TW); Shang-Tai Yeh, Taipei (TW); Hung-Yun Tai, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 83 days.

(21) Appl. No.: 14/561,192

(22) Filed: Dec. 4, 2014

(65) Prior Publication Data

US 2015/0153900 A1   Jun. 4, 2015

Related U.S. Application Data

(60) Provisional application No. 61/911,564, filed on Dec. 4, 2013, provisional application No. 61/912,078, filed on Dec. 5, 2013.

(30) Foreign Application Priority Data

May 14, 2014   (TW) .............................. 103117027 A

(51) Int. Cl.
*G06F 3/045* (2006.01)
*G06F 3/041* (2006.01)
*G06F 3/044* (2006.01)

(52) U.S. Cl.
CPC .............. *G06F 3/0418* (2013.01); *G06F 3/044* (2013.01); *G06F 2203/04108* (2013.01)

(58) Field of Classification Search
CPC ................................ G06F 3/044; G06F 3/0418
See application file for complete search history.

(56) References Cited

U.S. PATENT DOCUMENTS

| 2006/0279551 | A1* | 12/2006 | Lii | G06F 3/044 345/173 |
| 2011/0063993 | A1* | 3/2011 | Wilson | G06F 3/044 370/254 |
| 2012/0212240 | A1* | 8/2012 | Young | G01R 27/2605 324/679 |
| 2012/0249442 | A1* | 10/2012 | Chang | G06F 3/0416 345/173 |
| 2012/0313888 | A1* | 12/2012 | Lee | G06F 3/044 345/174 |
| 2013/0063370 | A1* | 3/2013 | Lee | G06F 3/044 345/173 |

\* cited by examiner

*Primary Examiner* — Temesgh Ghebretinsae
*Assistant Examiner* — Hang Lin
(74) *Attorney, Agent, or Firm* — WPAT, PC; Justin King; Douglas Hosack

(57) ABSTRACT

The present invention provides a method for detecting touch trace while preventing interruption of the touch traces in the presence of interfering noise, comprising: changing frequency of driving signals in response to a detection of noise; setting a plurality of lines of first sensing signal values obtained from a first sensing as a plurality of baselines; obtaining a plurality of difference values by comparing a plurality of lines of second sensing signal values obtained from a second sensing against said plurality of baselines; determining whether all said plurality of difference values are smaller than a threshold value; determining whether the flatness of said plurality of baselines is greater than a flatness threshold value if all said plurality of difference values are determined to be smaller than said threshold value; and reporting, in response to the flatness of said plurality of baselines is determined to be greater than said flatness threshold value, a first proximity or touch event, said first proximity or touch event being the last proximity or touch event taking place before frequency of said driving signals is changed.

18 Claims, 5 Drawing Sheets

TOUCH TRACE DETECTING DEVICE, SYSTEM AND METHOD THEREOF

CROSS REFERENCE TO RELATED APPLICATIONS

This application claims priority under 35 U.S.C 119 to U.S. patent application, 61/911,564, filed on Dec. 4, 2013, and Taiwan patent application, TW 103117027, filed on May 14, 2014, the disclosures of which are incorporated herein by reference.

BACKGROUND OF THE INVENTION

1. Field of the Invention

The present invention relates to the touch screen technology, and more particularly, to the touch screen technology with Class A electromagnetic compatibility.

2. Description of the Prior Art

Electronic products emit electromagnetic radiation which usually causes one-way or mutual interference between each other. Designers and manufacturers of electronic products therefore must take into consideration the product's electromagnetic compatibility (EMC). EMC typically refers to the level of electromagnetic interference (EMI) resulting from electromagnetic radiation unintentionally generated, forwarded/relayed or received, to or from another electronic product.

Touch screen has become an important user-machine interface for the electronic products. Generally speaking, touch screens are usually equipped with a larger size of sensing electrodes. Proximity or touch events, also known as approximating or touching events, that take place on a touch screen are detected by measuring the weak currents flowing across the sensing electrodes. As a result, touch screen is vulnerable to electromagnetic interferences brought about through an external conductor, such as a contacting or approximating human body or stylus, or through the power or I/O lines.

The electromagnetic compatibility of an electronic product can be rated according to how the interference resulted from the noise is experienced by the user. If the user does not feel the presence of the occurring noise (thus the interference) at all, the compatibility is considered as Class A. If the noise can be detected but everything returns to normal again when it disappears, the compatibility is considered as Class B.

A typical capacitive touch screen includes an array of driving and sensing electrodes, where the row electrodes are orthogonal and exposed to the column electrodes. The multiple rows, for example, of driving electrodes are designed to emit impulses, the driving signals, which are sensed at a later time by the multiple columns of sensing electrodes. The driving signal is generated with respect to a particular working frequency that the timings of sensing and sampling by the sensing electrodes follow. External noises that come along with the human body, stylus, power lines or I/O lines are usually with respect to a certain frequency.

When the driving electrodes are not emitting the driving signals, the external interfering noise can be sensed by the sensing electrodes. If the noise frequency is closed to, identical or harmonic to the working frequency of the driving signal, the sensing electrodes' sampling and sensing of the driving signal will be severely interfered. In such case, the working frequency of the driving signal must be changed to avoid interference from the noise.

When the working frequency of the driving signal is changed, there are two possible consequences. Scanning of the touch screen at the new working frequency may generate sensing results different from those obtained prior to the frequency change, leading to displacements in the determined touch location. Or, the sensing electrode may simply stop reporting touch location information during the time period of changed working frequency. In either case, a broken touch trace could result when the user tries, for example, to draw a line using his finger. This causes the user's intended operation to fail. The user may succeed on a second attempt at a later time though. When this is the case, the electromagnetic compatibility of the electronic product would be determined as Class B. Solutions are desired to render Class A compatibility for the current capacitive touch screens, so a better user experience can be achieved.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

In one embodiment of the present invention, a touch detection method for a touch screen is provided, comprising: changing the working frequency of the driving signal in response to the detection of noise; executing a first sensing of a plurality of sensing electrodes to obtain a plurality of lines of first sensing data (for the purpose of explaining the inventive concept, the terms "sensing signal value" or "signal intensity" will be used hereinafter to refer to this general idea of "sensing data"); setting the plurality of lines of first sensing signal values as a plurality of baselines; setting those of the lines of first sensing signal values with defective flatness as pseudo baseline(s); executing a second sensing of the plurality of sensing electrodes to obtain a plurality of lines of second sensing signal values; determining whether a second proximity or touch event is present based on information from the plurality of baselines and the plurality of lines of second sensing signal values; when the second proximity or touch event is determined to be absent, determining whether a flag index of proximity or touch event is set; when the flag index of proximity or touch event is determined to have been set, determining if a pseudo baseline(s) is present; when the pseudo baseline is determined to be present, reporting the first proximity or touch event.

In another embodiment of the present invention, a touch detection device is provided for detecting proximity or touch events taking place on a touch screen. The provided touch detection device comprises a driving electrode interface for electrically coupling with and driving, by means of a voltage with a certain working frequency, a plurality of driving electrodes of the associated touch screen; a sensing electrode interface for electrically coupling with a plurality of sensing electrodes of the associated touch screen, and receiving a plurality of lines of sensing signal values therefrom; and a control module which is electrically coupled with the driving electrode interface and the sensing electrode interface. The provided touch detection device is for executing the detection method described above.

In yet another embodiment of the present invention, a touch detection system is provided. The provided touch detection system comprises the provided touch detection device described above, and an associated touch screen that works with the provided touch detection device.

In one embodiment of the present invention, a method is provided for detecting touch traces on a touch screen. The provided method is designed to detect touch traces while preventing interruption of the touch traces in the presence of interfering noise. The provided method comprises: changing the frequency of the associated driving signals in response to the detection of noise; setting a plurality of lines of first sensing signal values generated from a first sensing of the associated sensing electrodes as a plurality of baselines; computing a plurality of difference data between the baselines and a plurality of lines of second sensing signal values generated from a second sensing of the associated sensing electrodes; determining whether all of the difference values are smaller than a threshold value; when all of the difference values are determined to be smaller than the threshold value, determining whether the flatness of the baselines is greater than a flatness threshold value; and when the flatness of the baselines is determined to be greater than the flatness threshold value, reporting a first proximity or touch event which last took place before the working frequency of the driving signal was changed.

In another embodiment of the present invention, a device for detecting touch trace on a touch screen is provided, which is designed to detect touch traces while preventing interruption of the touch traces in the presence of interfering noise. The provided detection device is for executing the provided touch trace detection methods described above.

In yet another embodiment of the present invention, a system for detecting touch traces on the touch screen is provided, which is designed to detect touch traces while preventing interruption of the touch traces in the presence of interfering noise. The provided system comprises: a touch screen comprising a plurality of driving electrodes and a plurality of sensing electrodes; and a detection device electrically coupled with the driving electrodes and sensing electrodes for executing the detection methods described above.

One of the major findings of the present invention is to prevent the user from experiencing noise jamming by reporting an already detected proximity or touch event when the working frequency of the driving electrodes (thus the driving signals) of a touch screen is changed in response to the detection of noise, but a correct new baseline is unavailable due to the approximating/touching object remaining still on the touch screen till after the change of the working frequency.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
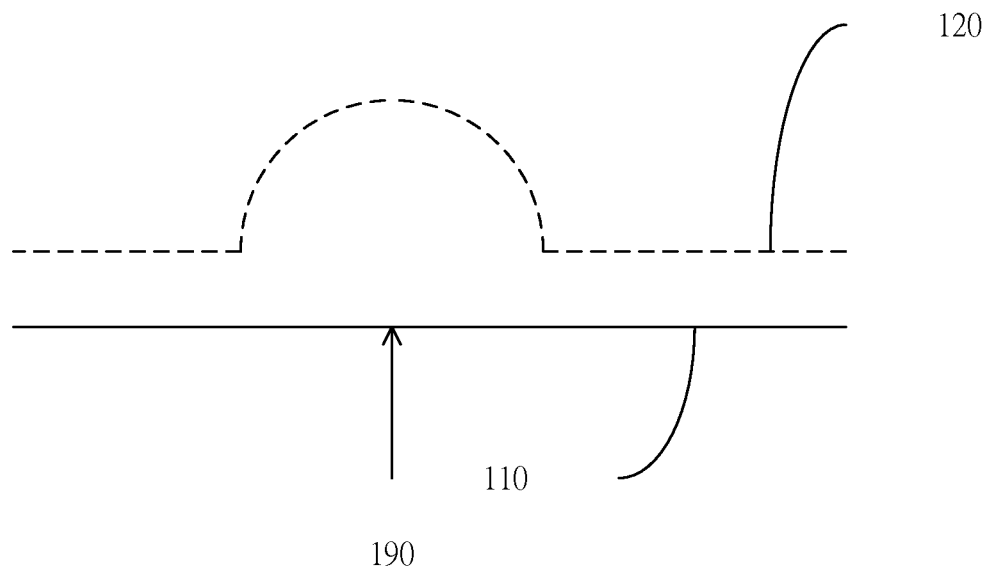
FIG. 1 is an illustration of signal intensity sensed with the associated touch screen operating at a first working frequency.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Referring to FIG. 1, which is an illustration of signal intensity sensed with the associated touch screen operating at a first working frequency. In one embodiment, the horizontal axis represents the direction along which one sensing electrode extends, and the vertical axis represents the signal intensity sensed by that sensing electrode. In this embodiment, the sensing electrode intersects with multiple driving electrodes. By driving these driving electrodes sequentially, signal intensity at individual intersection can be measured by the sensing electrode. Alternatively, in another embodiment, the horizontal axis represents the direction along which one driving electrode extends. The driving electrode intersects with multiple sensing electrodes, and the sensed signal intensity at individual intersection is shown in the vertical axis. As will be understood by people skilled in the art, in the above embodiments, the direction of the sensed signal intensity is parallel to one along which the driving or sensing electrode extends, where these two electrodes are typically arranged to be orthogonal to each other. Signal intensity in either direction is applicable to the following embodiments.

As shown in FIG. 1, the line 110 represents signal intensity sensed by a plurality of sensing electrodes intersecting one common driving electrode which is driven by a first working frequency. In one example, the line 110 is set as a baseline, also known as stray capacitance. To serve as a true baseline, the flatness of the line 110 must meet some criteria. It is noted that in the present invention, the signal intensity can be obtained either by measuring the change in electrical coupling sensed by a single sensing electrode, or by reversing the difference between the electrical coupling changes sensed by neighboring sensing electrodes, or by reversing a dual difference value of differences between neighboring sensing electrodes. The present invention does not limit the source of the signal intensity.

As shown in FIG. 1, there is a curve line 120 which shows signal intensity sensed by the same sensing electrodes working at the first working frequency. The curve line 120 has a protruding portion centered at a location 190. An obvious change in capacitance at the location 190 can thus be identified by measuring the difference between individual points along the lines 110 and 120. As a result, it can be determined that a conductive object is approximating or touching the associated touch screen at the location 190.

In one example, before the next scan of the touch screen is executed, if external interfering noise with frequencies identical to, closed to or harmonic to the first working frequency is detected by the sensing electrodes, the frequency of the driving signal will be changed to a second working frequency to avoid interference from the detected noise. In another example, when an approximating/touching object is detected, a responsive flag index of proximity or touch event will be set before the next scan of the touch screen is executed.

Figure 2:
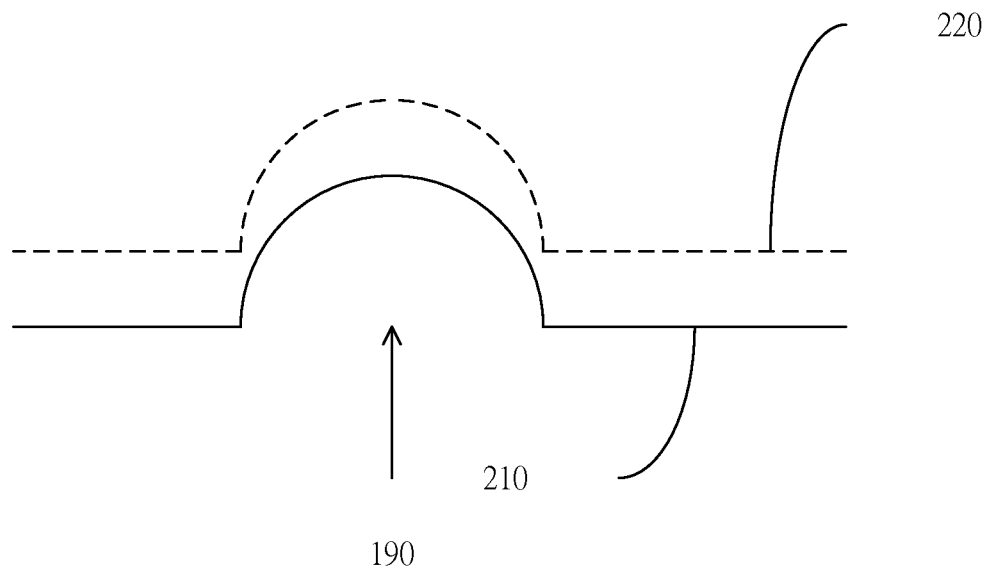
FIG. 2 is an illustration of signal intensity sensed with the associated touch screen operating at a second working frequency.

Reference is now made to FIG. 2, which is an illustration of signal intensity sensed with the associated touch screen operating at a second working frequency. Due to the change of the working frequency (from the first to the second), when the next scan is executed, the original baseline 110 can no longer be used. In one example, during this second scan, the approximating/touching object stands still in its original position on the touch screen, resulting in a sensed signal intensity line 210. As shown, the line 210 has a curved portion at the location 190. Being the first scan result at the second working frequency, the line 210 will be set as the baseline for the second working frequency work period, despite the obvious defective flatness at the location 190. However, because of its defective flatness, such baseline is questionable. Therefore, the baseline represented by the line 210, characterized by its defective flatness, will be referred to as a pseudo baseline or special baseline hereinafter.

In this embodiment, the approximating/touching object remains still on the touch screen when a third scan of the touch screen is executed at the second working frequency, and a signal intensity line 220 is thus obtained. As shown, the line 220 suggests substantially identical capacitance changes as the baseline 210. As no difference from the baseline can be identified, the approximating/touching object cannot be sensed. In other words, the approximating/touching object will not be able to be found either from the sensing results of one single sensing electrode, the difference in the neighboring sensing results, or the dual difference computed therefrom. In one example, when such situation occurs, the associated touch screen will be instructed to check whether a flag index of proximity or touch event is set, and/or to evaluate the flatness of the line 220 to determine what to do next. For example, if it is determined that the flag index of proximity or touch event has been set, and the flatness of the line 220 is defective, and no approximating or touching object is detected, a pseudo touch location will be reported accordingly. For example, the location 190 may be reported again, or a predicted location where the approximating/touching object is expected to show up at the end of the third scan may be reported. Consider, for example, the approximating/touching object to be a human finger which would always cover a small area of the touch screen. In such case, reporting the location 190 twice can prevent the interruption of the continuity between proximity or touch events (i.e. the touch trace) without affecting the user's experience. As a result, user's recognition of the interfering noise is prevented, allowing the associated touch product for a Class A compatibility with the CS noise.

Figure 3:
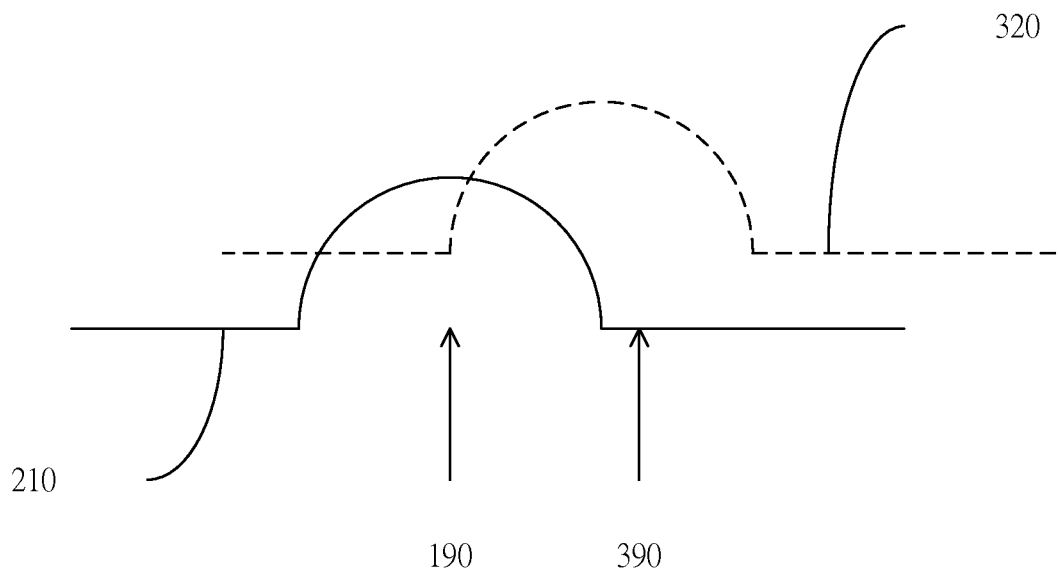
FIG. 3 is an illustration of signal intensity sensed with the associated touch screen operating at a second working frequency in the presence of an approximating or touching object moving on the associated touch screen.

Referring to FIG. 3, which is an illustration of signal intensity sensed with the associated touch screen operating at a second working frequency in the presence of an approximating or touching object moving on the associated touch screen. In this example, another scan is executed while the approximating or touching object starts to move on the touch screen surface in a direction away from the location 190. A signal intensity line 320 is therefore obtained. As shown, a displacement between the protruding portion of the line 320 and the one of the pseudo baseline 210 is resulted. A new touch location 390 can therefore been found from the sensing results of one single sensing electrode, the difference in the neighboring sensing results, or the dual difference computed therefrom.

Because of the fact that the pseudo touch location 190 (or any predicted location nearby, as described above) and the newly found touch location 390 have been reported in turn, and that the flag index of proximity or touch event is present, it is determined that the proximity or touch events are continuous at the locations 190 and 390, therefore a connection should be established from the location 190 to the new location 390. In other words, the touch trace of the approximating or touching object at issue is determined to have extended from the location 190 to the location 390. A continuous touch trace is thus achieved in the presence of noise. As a result, the CS noise will not be recognized by the user, rendering Class A noise compatibility for the associated electronic product. It is noted that when the new touch location 390 has been sensed and determined to be different from the old touch location 190, the flag index of proximity or touch event may be removed.

Figure 4:
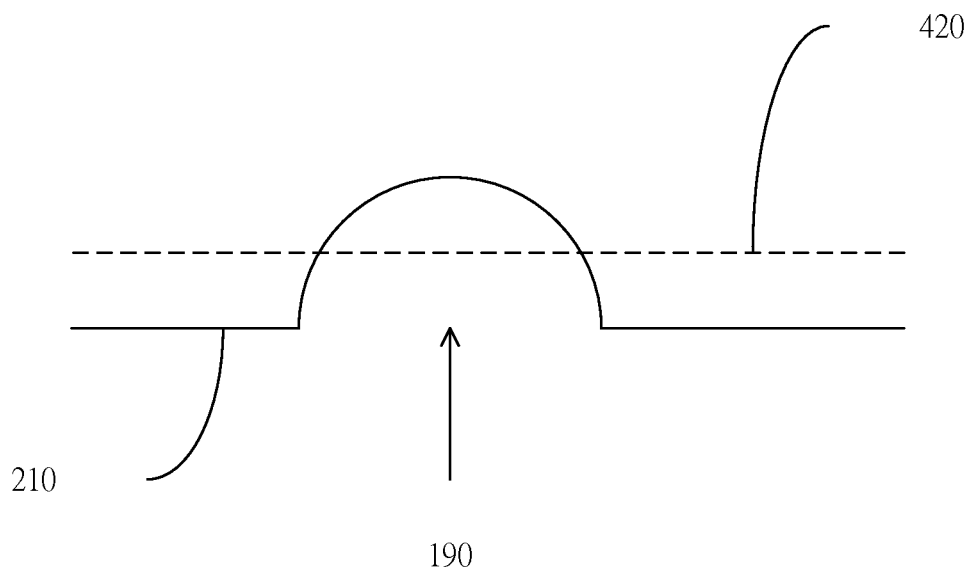
FIG. 4 is an illustration of signal intensity sensed with the associated touch screen operating at a second working frequency when the approximating or touching object has left the surface of the associated touch screen.

Referring to FIG. 4, which is an illustration of signal intensity sensed with the associated touch screen operating at a second working frequency when the approximating or touching object has left the surface of the associated touch screen. As shown, when the object is no longer in the proximity of or touching the surface of the associated touch screen, the sensed signal intensity is substantially a horizontal straight line 420. As it is negatively offset from the pseudo baseline 210 around the location 190, and has a substantially perfect flatness, the line 420 will be set to replace the pseudo baseline 210 and become the new baseline for subsequent operations. Reporting of pseudo touch locations will end, too. These combined indicate that the approximating/touching object at issue has left the surface of the touch screen. The flag index of proximity or touch event will be cleared. As a result, the user will not feel the existence of the interfering noise, rendering Class A noise compatibility for the associated touch product.

In alternative embodiments, not only the sensing result of one particular sensing electrode (the line 420), but the sensing results of all the sensing electrodes are set as the new baselines for the entire electrode array (i.e. the entire touch screen) at the second working frequency. In other words, the baseline can be updated from one sensing electrode to another or for all the sensing electrodes at one time. For example, in the case of multi-touch environment, the line-by-line manner is more suitable in the sense that individual reporting of touch location will not affect each other.

Determination of the flatness defect of a line of signal intensity can be carried out by comparing the difference in the sensing results from two neighboring points on a sensing electrode with a flatness threshold value. For example, if the value of difference is greater than the flatness threshold value, the flatness of the signal intensity line obtained from that sensing electrode is deemed to be defective. Alternatively, the sensing result difference between two points, neighboring or not, on a sensing electrode can be compared with another sensing result difference obtained from two corresponding points on another sensing electrode, and a dual difference value can thus be obtained. This dual difference is then compared with another flatness threshold value which might be the same as or different from the above one. If the dual difference is greater than this second flatness threshold value, the flatness of the signal intensity lines obtained from the two electrodes at issue is deemed to be defective.

In some embodiments, if the flatness of the signal intensity line of any sensing electrode is determined to be defective, it may be determined that the signal intensity line flatness of the entire electrode array (i.e. the entire touch screen) is defective. Similarly, if the flatness of the signal intensity line of any two neighboring sensing electrodes is determined to be defective, it may be determined that the signal intensity line flatness of the entire touch screen is defective. In other embodiments however, the defective flatness is determined to be only applicable to those sensing electrodes at issue.

Figure 5:
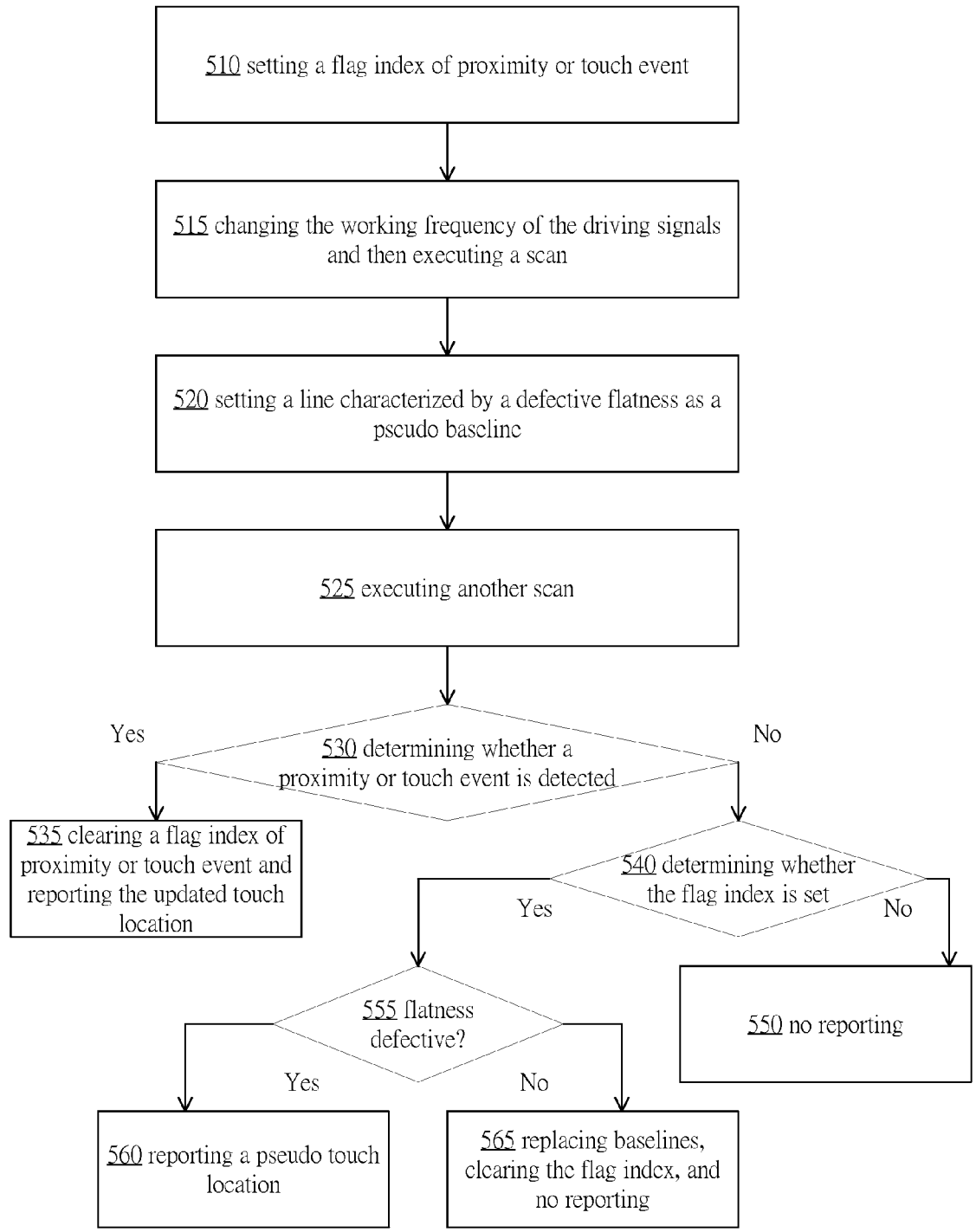
FIG. 5 is a flow chart of a method for reporting the touch location in accordance with an embodiment of the present invention.

Referring to FIG. 5, which is a flow chart of a method for reporting the touch location in accordance with an embodiment of the present invention. The provided method is to be used in the situations described in conjunction with FIG. 1~4, where the working frequency of the driving signals has been determined to be changed in response to the detection of noise, while an approximating/touching object remains still on or approximating the associated touch screen. As shown, the method comprising:

Step 510: Setting a flag index of proximity or touch event;

Step 515: Changing the working frequency of the driving signals, and then executing a scan of the touch screen (for the purpose of explanation, the line 210 described above will be used as the scan result in this example);

Step 520: Setting the line 210, characterized by a defective flatness, as a pseudo baseline;

Step 525: Executing another scan of the touch screen (for the purpose of explanation, the line 220, 320 or 420 described above will be used as the scan result in this example)

Step 530: Determining whether a proximity or touch event is detected, if so (for example the scan result in Step 525 is the line 320) then performing Step 535; otherwise (for example the scan result in Step 525 is the line 220 or 420) performing Step 540;

Step 535: Clearing the flag index of proximity or touch event and reporting the updated touch location in response to the detection of proximity or touch event;

Step 540: Determining whether the flag index of proximity or touch event has been set, if so, performing Step 555, otherwise performing Step 550;

Step 550: No reporting of touch location if no proximity or touch event is detected and no flag index of proximity or touch event is set. Therefore, when the process flows comes to Step 550, the associated touch screen probably has returned to the normal operation;

Step 555: Determining whether the flatness of the scan results from Step 525 is defective, if so, performing Step 560, otherwise performing Step 565;

Step 560: Reporting a pseudo touch location (reporting of pseudo touch location is necessary when no proximity or touch event is detected, plus a flag index of proximity or touch event is set, plus the scan results from Step 525 have a defective flatness, such as the example described in conjunction with FIG. 2); and Step 565: Replacing the pseudo baseline with the scan results from Sep 525 and clearing the flag index of proximity or touch event without reporting a touch location, as in the example shown in FIG. 4, where no proximity or touch event is detected, a flag index of proximity or touch event is set, and the flatness of the scan results from Step 525 is flawless.

It is noted that all of Steps 535, 550, 560, and 565 can be followed by Step 525.

Figure 6:
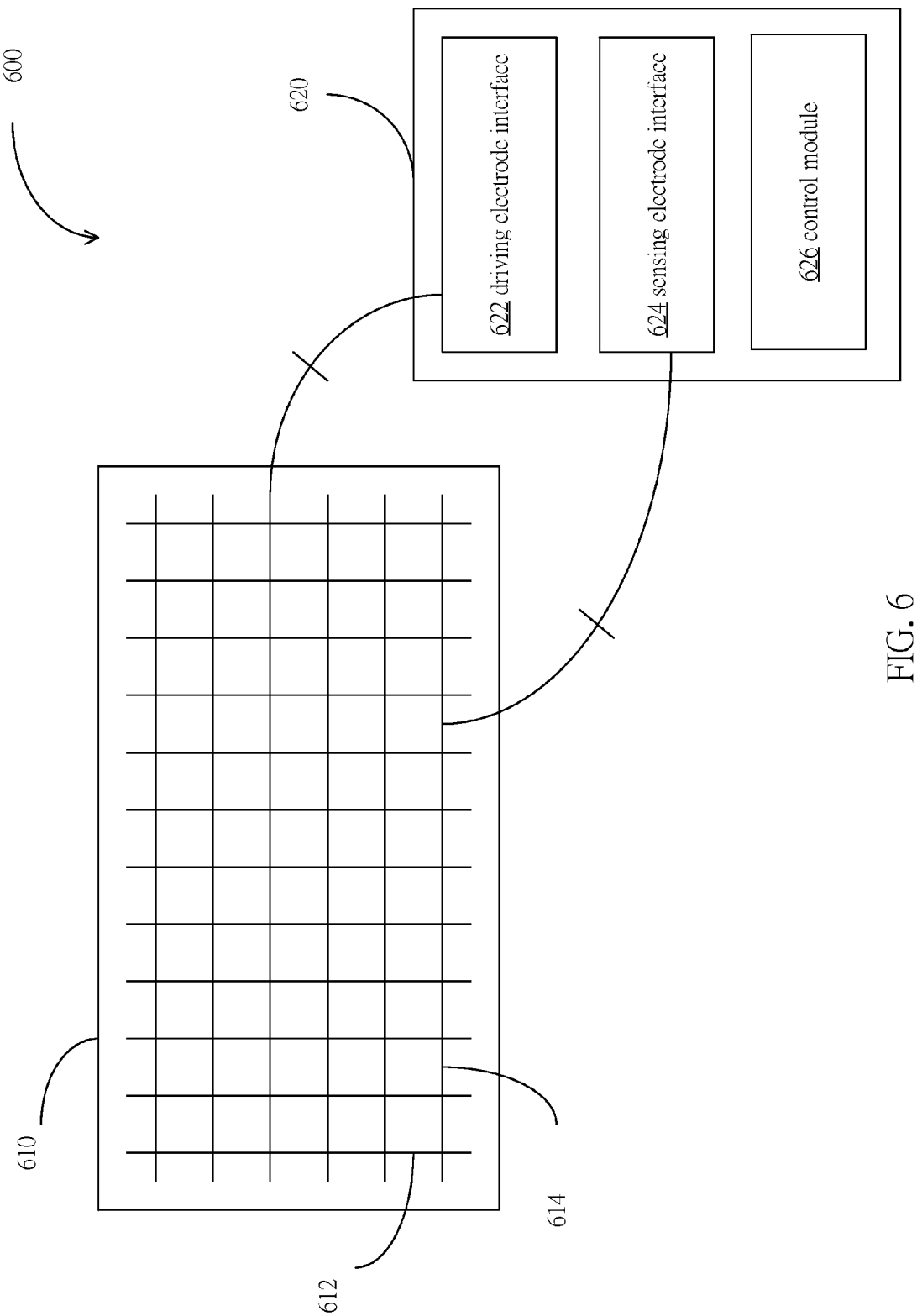
FIG. 6 is a block diagram of a system for detecting touch traces on the touch screen in accordance with an embodiment of the present invention.

Referring to FIG. 6, which is a block diagram of a system 600 for detecting touch traces on the touch screen in accordance with an embodiment of the present invention. As shown, the provided system 600 comprises a touch screen 610 and a touch detection device 620. The touch detection device 620 is for sensing the proximity or touch events taking place on the touch screen 610. The touch screen 610 comprises a plurality of driving electrodes 612 and a plurality of sensing electrodes 614. The touch detection device 620 comprises a driving electrode interface 622 for electrically coupling with and driving, by means of a voltage with a certain working frequency, the driving electrodes 612 of the touch screen 610. The touch detection device 620 further comprises a sensing electrode interface 624 for electrically coupling with the sensing electrodes 614, and receiving a plurality of lines of sensing signal intensity (or say sensing signal values) therefrom.

The touch detection device 620 further comprises a control module 626 which is electrically coupled to the driving electrode interface 622 and sensing electrode interface 624. The control module 626 is for executing a method comprising at least the following steps: (1) changing the working frequency of the driving electrodes, thus the driving signals, as a response to the detection of noise, and then executing a first sensing of the plurality of sensing electrodes to obtain a plurality lines of first sensing signal, and setting these first sensing signal lines as a plurality of baselines; (2) setting those of the plurality of first sensing signal lines that have defective flatness as pseudo baselines; (3) executing a second sensing of the plurality of sensing electrodes to obtain a plurality lines of second sensing signal; (4) determining whether a second proximity or touch event is present based on information provided by the plurality of baselines and the plurality of second sensing signal lines; (5) if the second proximity or touch event is determined to be absent, determining whether a flag index of proximity or touch event is set; (6) if the flag index of proximity or touch event is determined to have been set, determining whether a pseudo baseline(s) is present; (6) if the pseudo baseline is determined to be present, reporting a first proximity or touch event which the flag index of proximity or touch event corresponds to.

It is noted that in addition to the actions described above, the control module 626 can carry out alternative embodiments, such as those described in conjunction with FIG. 5, and variants derived therefrom.

Figure 7:
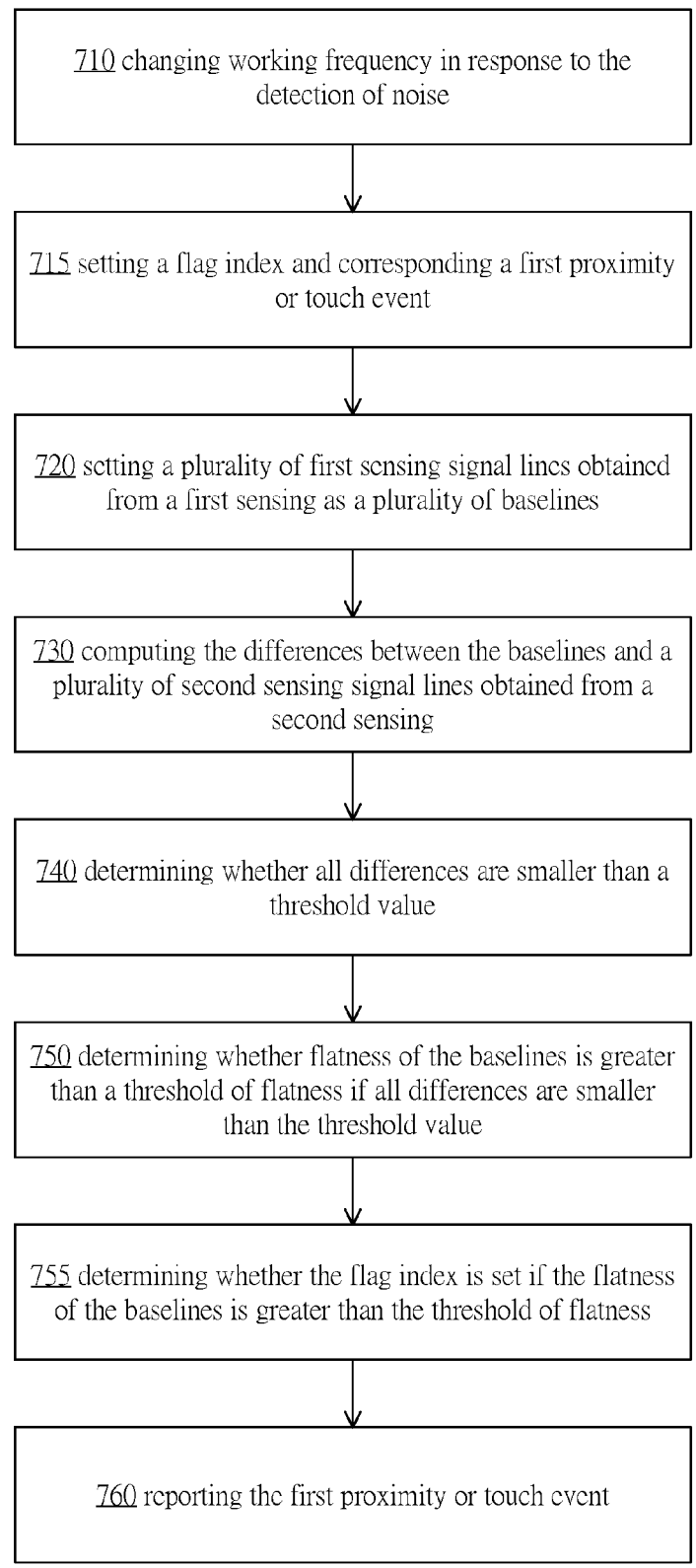
FIG. 7 is a flow chart of a method for reporting the touch location in accordance with another embodiment of the present invention.

Referring to FIG. 7, which is a flow chart of a method for reporting the touch location in accordance with another embodiment of the present invention. The provided method is to be used in the situations described in conjunction with FIG. 1~6, wherein noise was detected and the working frequency of the driving electrodes (thus the driving signals) has been determined to be changed. It is noted that the provided method described here in conjunction with FIG. 7 and its variants can be carried out by the control module 626 described above in conjunction with FIG. 6. As shown in FIG. 7, the provided method comprising:

Step 710: Changing the working frequency of the driving electrodes, thus the driving signals, in response to the detection of noise;

(Optional) Step 715: Setting a flag index of proximity or touch event, wherein the flag index of proximity or touch event corresponds to a first proximity or touch event;

Step 720: Setting a plurality of first sensing signal lines, obtained from a first sensing of the sensing electrodes, as a plurality of baselines;

Step 730: Computing the difference values between the baselines and a plurality of second sensing signal lines, obtained from a second sensing of the sensing electrodes, to obtain a plurality of difference values;

Step 740: Determining whether all the plurality of difference values are smaller than a threshold value;

Step 750: Determining, when all the plurality of difference values are determined to be smaller than the threshold value, whether the flatness of the plurality of baselines is greater than a threshold of flatness;

(Optional) Step 755: Determining, when the flatness of the plurality of baselines is determined to be greater than the threshold of flatness, whether a flag index of proximity or touch event is set; and Step 760: Reporting the first proximity or touch event which took place before the working frequency of the driving signal was changed.

In one example, Step 715 and Step 755 are skipped. In another example, Step 715 and Step 755 are executed, followed by Step 760 where the first proximity or touch event, to which the flag index of proximity or touch event corresponds, is reported.

In one example, at least one of the sensing electrodes whose sensing signal line flatness is greater than the threshold of flatness corresponds to a smaller difference value than the threshold value.

Similar to the embodiment described in conjunction with FIG. 3, the method described in conjunction with FIG. 7 may further comprise determining, when at least one of the difference values is greater than the threshold value, the presence of a second proximity or touch event based on at least one of the difference values, and reporting the second proximity or touch event at a later time point. Moreover, if a flag index of proximity or touch event is set for the second proximity or touch event, the method described in conjunction with FIG. 7 may further comprise a step of clearing this flag index.

In the heart of the findings of the present invention, an already detected proximity or touch event is reported when the working frequency of the driving electrodes (thus the driving signals) of a touch screen is changed in response to the detection of noise, but a correct new baseline is unavailable due to the approximating/touching object remaining still on the touch screen till after the change of the working frequency. As a result, the user's recognition of the interfering noise is prevented.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A method for detecting touch trace while preventing interruption of the touch traces in the presence of interfering noise, comprising: changing frequency of driving signals in response to a detection of noise; setting a plurality of lines of first sensing signal values obtained from a first sensing as a plurality of baselines; obtaining a plurality of difference values by comparing a plurality of lines of second sensing signal values obtained from a second sensing against said plurality of baselines; determining whether all said plurality of difference values are smaller than a threshold value;

determining whether a flatness of said plurality of baselines is greater than a flatness threshold value when all said plurality of difference values are determined to be smaller than said threshold value; and reporting, in response to the flatness of said plurality of baselines is determined to be greater than said flatness threshold value, a first proximity or touch event, said first proximity or touch event being the last proximity or touch event taking place before frequency of said driving signals is changed.

2. The method according to claim 1, further comprising: determining, in response to the flatness of said plurality of baselines is determined to be greater than said flatness threshold value, whether a flag index of proximity or touch event is set; and reporting said first proximity or touch event corresponding to said flag index when said flag index of proximity or touch event is determined to have been set.

3. The method according to claim 2, wherein the step of changing frequency of driving signals further comprising:
setting up said flag index and corresponding proximity or touch event.

4. The method according to claim 1, wherein when at least one of said flatness corresponding to at least one sensing electrode is greater than said flatness threshold value, at least one of said difference value corresponding to said at least one sensing electrode is smaller than said threshold value.

5. The method according to claim 1, further comprising:
computing, in response to at least one of said difference value is determined to be greater than said threshold value, a second proximity or touch event based on at least one of said difference values; and
reporting said second proximity or touch event.

6. The method according to claim 5, further comprising:
clearing said flag index of proximity or touch event.

7. A device for detecting touch trace while preventing interruption of the touch traces in the presence of interfering noise, said device is configured for: changing frequency of driving signals in response to a detection of noise; setting a plurality of lines of first sensing signal values obtained from a first sensing as a plurality of baselines; obtaining a plurality of difference values by comparing a plurality of lines of second sensing signal values obtained from a second sensing against said plurality of baselines; determining whether all said plurality of difference values are smaller than a threshold value; determining whether a flatness of said plurality of baselines is greater than a flatness threshold value when all said plurality of difference values are determined to be smaller than said threshold value; and reporting, in response to the flatness of said plurality of baselines is determined to be greater than said flatness threshold value, a first proximity or touch event, said first proximity or touch event being the last proximity or touch event taking place before frequency of said driving signals is changed.

8. The device according to claim 7, further configured for:
determining, in response to the flatness of said plurality of baselines is determined to be greater than said flatness threshold value, whether a flag index of proximity or touch event is set; and
reporting said first proximity or touch event corresponding to said flag index when said flag index of proximity or touch event is determined to have been set.

9. The device according to claim 8, wherein the step of changing frequency of driving signals further comprising:
setting up said flag index and corresponding proximity or touch event.

10. The device according to claim 7, wherein when at least one of said flatness corresponding to at least one sensing electrode is greater than said flatness threshold value, at least one of said difference value corresponding to said at least one sensing electrode is smaller than said threshold value.

11. The device according to claim 7, further configured for:
computing, in response to at least one of said difference value is determined to be greater than said threshold value, a second proximity or touch event based on at least one of said difference values; and
reporting said second proximity or touch event.

12. The device according to claim 11, further configured for:
    clearing said flag index of proximity or touch event.

13. A touch trace detecting system for preventing interruption of the touch traces in the presence of interfering noise, comprising: a touch screen, which comprises a plurality of driving electrodes and a plurality of sensing electrodes; and a sensing device, which is electrically coupled to said plurality of driving electrodes and sensing electrodes, wherein said sensing device is configured for: changing frequency of driving signals in response to a detection of noise; setting a plurality of lines of first sensing signal values obtained from a first sensing as a plurality of baselines; obtaining a plurality of difference values by comparing a plurality of lines of second sensing signal values obtained from a second sensing against said plurality of baselines; determining whether all said plurality of difference values are smaller than a threshold value;
    determining whether a flatness of said plurality of baselines is greater than a flatness threshold value when all said plurality of difference values are determined to be smaller than said threshold value; and reporting, in response to the flatness of said plurality of baselines is determined to be greater than said flatness threshold value, a first proximity or touch event, said first proximity or touch event being the last proximity or touch event taking place before frequency of said driving signals is changed.

14. The system according to claim 13, wherein said sensing device further configured for: determining, in response to the flatness of said plurality of baselines is determined to be greater than said flatness threshold value, whether a flag index of proximity or touch event is set; and reporting said first proximity or touch event corresponding to said flag index when said flag index of proximity or touch event is determined to have been set.

15. The system according to claim 14, wherein the step of changing frequency of driving signals further comprising:
    setting up said flag index and corresponding proximity or touch event.

16. The system according to claim 13, wherein when at least one of said flatness corresponding to at least one sensing electrode is greater than said flatness threshold value, at least one of said difference value corresponding to said at least one sensing electrode is smaller than said threshold value.

17. The system according to claim 13, wherein said sensing device further configured for:
    computing, in response to at least one of said difference value is determined to be greater than said threshold value, a second proximity or touch event based on at least one of said difference values; and
    reporting said second proximity or touch event.

18. The system according to claim 17, wherein said sensing device configured for:
    clearing said flag index of proximity or touch event.

* * * * *